Patented July 31, 1951

2,562,852

UNITED STATES PATENT OFFICE 2,562,852

PROCESS OF PREPARING HETEROPOLY-MERS OF UNSATURATED CARBOXYLIC ACIDS WITH ESTERS OF UNSATURATED ALCOHOLS

Massimo Baer, Springfield, Mass., assignor to Monsanto Chemical Company, St. Louis, Mo., a corporation of Delaware No Drawing. Application December 6, 1947, Serial No. 790,221

6 Claims. (Cl. 260—78.5)

This invention relates to a process for preparing heteropolymers of alpha-beta-unsaturated dicarboxylic acid anhydride and esters of organic acids with alcohols containing a $CH_2=C<$ group.

It is known to copolymerize alpha-beta-unsaturated carboxylic acid anhydrides with esters of organic acids with alcohols containing a $CH_2=C<$ group. Such products have proved to be useful for certain purposes. However, it has been evident that the usefulness of such polymerization products would be enhanced if they could be so prepared as to develop even greater viscosity in solutions thereof.

It is an object of this invention to provide a new process for copolymerizing alpha-beta-unsaturated dicarboxylic acid anhydrides with esters of organic acids and alcohols containing a $CH_2=C<$ group. A particular object of this invention is to prepare heteropolymers of alpha-beta-unsaturated dicarboxylic acid anhydrides and esters of organic acids with alcohols containing a $CH_2=C<$ group, said heteropolymers possessing unusually high viscosity characteristics.

These and other objects are accomplished according to the present invention by copolymerizing alpha-beta-unsaturated dicarboxylic acid anhydrides and esters of organic acids with alcohols containing a $CH_2=C<$ group in the presence of a liquid medium which is a solvent for the monomeric materials, but a non-solvent for the heteropolymers, the amount of said liquid medium being sufficiently low so that the product is obtained in the form of a gel. Surprisingly, it is found that by carrying out the polymerization in this manner, solutions of the resulting heteropolymers have unusually high viscosity characteristics. Polymerization in the presence of a material which is a solvent for the monomeric materials, but a non-solvent for the polymer is herein designated as a solvent-non-solvent type of polymerization.

The following examples are given in illustration of the process of the invention, but are not to be construed as limitative thereof. Where parts are mentioned, they are parts by weight.

Example I

| | Parts |
|---|---|
| Vinyl acetate | 86 |
| Maleic anhydride | 98 |
| Benzene | 35 |
| Benzoyl peroxide | 0.12 |

The above ingredients are placed in a suitable vessel and after replacing the air above the charge with nitrogen, the vessel is closed and heated at a temperature of 50° C. for 40 hours. The resulting product is a relatively stiff gel at ordinary temperatures from which the polymer may be recovered in the form of a very fine white powder by evaporating off the benzene. The product is found to have a specific viscosity of about 6.0 when in solution in water at 25° C. at a concentration of 0.4% using the well-known formula:

$$\frac{\text{Solution viscosity} - \text{Solvent viscosity}}{\text{Solvent viscosity}} = \text{Specific viscosity}$$

In Tables I and II are set forth additional examples exemplifying the process of the invention. The polymerization procedure in each case is the same as that in Example I except that the mixtures are heated at 50° C. for 72 hours in the case of the examples in Table I, at 50° C. for 64 hours in the case of Examples VI–VIII and at 50° C. for 40 hours in the case of Examples IX and X.

The products of each of the examples of Table I and Table II are white, water-soluble solids, solutions of which exhibit unusually high viscosities.

Table I

| Example | | II | III | IV | V |
|---|---|---|---|---|---|
| Maleic Anhydride | mol | 1.0 | 1.0 | 1.0 | 1.0 |
| Vinyl Acetate | mol | 0.9 | 0.9 | 0.75 | 0.75 |
| Vinyl Laurate | mol | 0.1 | | | |
| Vinyl Benzoate | mol | | | | 0.25 |
| Ethyl hexyl methacrylate | mol | | 0.1 | 0.25 | |
| Benzene | cc | 250 | 250 | 250 | 250 |
| Benzoyl Peroxide | gram | 0.2 | 0.6 | 0.6 | 0.2 |

Table II

| Example | | VI | VII | VIII | IX | X |
|---|---|---|---|---|---|---|
| Maleic Anhydride | mol | 1.0 | 1.0 | 1.0 | 1.0 | 1.0 |
| Vinyl Acetate | mol | | 0.2 | 0.5 | 0.8 | 1.0 |
| Vinyl Formate | mol | 1.0 | 0.8 | 0.5 | 0.2 | 0.2 |
| Benzene | cc | 60 | 60 | 60 | 60 | 60 |
| Benzoyl Peroxide | gram | 0.2 | 0.2 | 0.2 | 0.2 | 0.2 |

As stated above, the process of the invention makes possible the production of heteropolymers of alpha-beta unsaturated carboxylic acid anhydrides and esters of carboxylic acids with alcohols containing a $CH_2=C<$ group which have unusually high specific viscosities. It is generally considered that polymerization in the absence of any solvent leads to products having higher viscosities than when the polymerization is carried out in the presence of a solvent for the monomeric materials. However, it is found that heteropolymers prepared in accordance with the invention have higher specific viscosities than those of products prepared either in the entire absence of solvent or in the presence of sufficient solvent-non-solvent so that a relatively fluid product results from the polymerization from which the heteropolymer quickly settles. Thus, it is to be seen that the increase in viscosity as the amount of solvent-non-solvent is decreased in any given polymerization charge is not a straight line function, but reaches a peak when the amount of solvent-non-solvent is sufficiently low to result in a gel-like polymerization product and falls off again when the solvent is completely eliminated.

Additional advantages of carrying out the polymerization in accordance with the invention include the recovery of the polymer in the form of a fine powder as contrasted with the hard solids which result from polymerization in the absence of solvent. On the other hand, only a relatively small amount of solvent-non-solvent is required in the process of the invention as compared with prior processes in which solvents are employed, thus appreciably diminishing the expense of removal and recovery of the solvent.

The effect of conducting the polymerization in accordance with the invention as contrasted with mass polymerization is clearly shown by the specific viscosities (at 25° C. in a 0.4% aqueous solution) given below of a series of heteropolymers made in the presence of a varying amount of benzene. In each case 245 parts of maleic anhydride, 225 parts of vinyl acetate and the indicated amount of benzoyl peroxide catalyst are heated at 50° C. to effect polymerization. Especial precautions are taken in the case of Example XI to insure a uniform polymerization temperature.

| Example | Benzene | Catalyst | Specific Viscosity |
|---|---|---|---|
| | Parts | Parts | |
| XI | | 0.04 | 1.25 |
| XII | 130 | 0.05 | |
| XIII | 180 | 0.05 | 3.8 |
| XIV | 220 | 0.05 | 3.2 |
| XV | 250 | 0.05 | 2.8 |
| XVI | 310 | 0.05 | 2.5 |
| XVII | 440 | 0.05 | 1.8 |

In addition to the advantage of achieving higher viscosities by means of the present invention, a much more controllable reaction occurs in the process of the invention than when the solvent-nonsolvent is eliminated. Thus, in the entire absence of solvent, not only is temperature control exceedingly difficult, but a reaction of nearly explosive character may occur. This necessitates the use of heavily constructed equipment which is not required in the process of the invention.

As a result of the high temperatures which frequently result from polymerization in the entire absence of solvent, the effectiveness of the catalyst greatly decreases so that complete polymerization does not occur even on long continued heating. When extremely small amounts of catalyst are used to achieve temperature control, the time required for complete polymerization may be unduly extended, the polymerization may be incomplete and/or the characteristics of the heteropolymer adversely affected.

In contrast to these results, the process of the invention permits the use of a wide range of catalyst concentration, e. g., 0.02–1.0 part for every 100 parts of monomeric material while at the same time achieving complete polymerization in a relatively short time under uniform temperature conditions.

Numerous variations may be introduced into the polymerization process of the invention as illustrated by the specific examples. Thus, the temperature at which the polymerization is carried out may be substantially varied, the exact temperature depending upon the particular materials being polymerized, the nature and amount of any catalyst which may be present, etc. However, it is usually found that a temperature of 30–150° C. and preferably 40–80° C. is advantageous.

Various molar ratios of ester to unsaturated dicarboxylic acid anhydride may be employed, e. g., from 1:9 to 9:1. Usually it is preferred that the ratio of unsaturated acid anhydride to ester does not exceed 1:1 since the use of an excess of the unsaturated acid anhydride may be undesirable in some cases. However, it may be desirable that the ratio of ester to unsaturated acid anhydride substantially exceed 1:1, for example, the ratio may be as high as 9:1 as pointed out above.

In place of vinyl acetate and vinyl formate used in the examples, other esters of monocarboxylic acids with alcohols containing a $CH_2=C<$ group may be employed. Thus, vinyl, allyl, methallyl, chloroallyl, chloromethallyl, etc., esters of such aliphatic or aromatic mono-carboxylic acids as formic, acetic, propionic, butyric, valeric, hexoic, lauric, stearic, benzoic acids may be used. Examples of such esters are vinyl formate, allyl acetate, vinyl propionate, vinyl butyrate, methallyl butyrate, vinyl valerate, vinyl hexoate, vinyl laurate, vinyl stearate, chloroallyl formate, chloromethallyl propionate, vinyl benzoate, and the like. Of these unsaturated esters, the vinyl esters form an especially preferred class and particularly, vinyl esters of aliphatic acids in which the acid portion contains 1–6 carbon atoms. When it is desired to prepare heteropolymers of vinyl esters having a substantial degree of solubility in water, the vinyl esters should be made from acids having not more than 2 carbon atoms. A preferred range of ratios of such vinyl esters, particularly when copolymerized with maleic acid anhydride, is to use 1–1.5 mols of the vinyl ester for each mol of the unsaturated acid anhydride. Thus, copolymers made from vinyl acetate and maleic acid anhydride using such ratios are found to act as excellent granulating agents and protective colloids in the polymerization of vinyl chloride while dispersed in water, by virtue of their water solubility and exceptionally high specific viscosities.

In place of maleic anhydride used in the specific examples, various derivatives thereof may be employed. Such compounds may be represented by the general formula

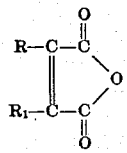

wherein R and $R_1$ stand for radicals from the group hydrogen, halogen, alkyl, aralkyl, aryl and alkaryl.

Examples of such anhydrides include maleic, phenyl maleic, benzyl maleic, dibenzyl maleic, ethyl maleic, chloromaleic, tolyl maleic, methyl ethyl maleic, diethyl maleic, chlormethyl maleic, etc.

The medium in which the polymerization is carried out is an inert material which is liquid at the temperature and pressure used for the polymerization. The inert material must also be a solvent for the unpolymerized materials in the concentrations used, as well as a non-solvent for the heteropolymer, at least to the extent of dissolving not more than 10% and preferably not more than 5% of the heteropolymer at the polymerization temperature. In place of benzene used in the specific examples, other media may be used which meet the requirements set forth above. Suitable over a wide range of polymerization conditions are such liquids as toluene, xylene, chlorobenzene, chlorotoluene, chloroxylene, etc. Usually, it is found that the liquids which are preferred for this purpose are aromatic hydrocarbons or the halogen derivatives thereof, e. g., chloro, bromo or fluoro derivatives. However, chloro, bromo, or fluoro aliphatic hydrocarbons may be used, e. g., dichloroethylene, trichloroethylene, or the corresponding bromo or fluoro compounds.

The amount of solvent for the monomeric materials which is used in the process of the invention may be substantially varied. Usually at least 10 parts of solvent are used for every 100 parts of the mixture of vinyl ester and unsaturated acid anhydride, so as to insure a controllable reaction and ready recovery of the heteropolymer in a finely divided state. On the other hand, more than 150 parts of solvent for every 100 parts of the monomeric mixture makes necessary the removal of large amounts of solvent and the heteropolymers prepared in the presence of such amounts of solvent do not possess the unexpected characteristics of the products resulting from polymerization in the presence of smaller amounts of solvent. A more preferred range of proportions of solvent-non-solvent is 20–100 parts for every 100 parts of monomeric materials. Within this range the viscosities of the heteropolymer are exceptionally high and a minimum of precautions are needed to control the reaction.

It is usually desirable that the polymerization be carried out in the absence of air, e. g., in the presence of an inert gas. To accomplish this result, it is customary to sweep out the air above the polymerization charge with such as inert gas as nitrogen, hydrogen, carbon dioxide or the like. Alternatively, a partial vacuum may be applied prior to sealing off the reaction vessel so that the reaction is carried out in the presence of vapor from the materials of the polymerization charge.

Usually, it is desirable to carry out the polymerization in the presence of a catalyst, although under some circumstances the polymerization may proceed with sufficient rapidity in the absence of a catalyst. When catalysts are used, they may comprise such oil-soluble per compounds as lauroyl peroxide, benzoyl peroxide, ditertiary butyl peroxide, oleyl peroxide, toluyl peroxide, and the like, or mixtures of these and other catalysts. In certain cases, the action of light may be helpful in expediting polymerization.

The copolymers obtained by the process of the invention are found to possess a high degree of utility for many purposes. For example, these products may be used as granulating agents in polymerization processes, as water thickeners, in paints, in printing inks, in textile sizes, in coating compositions for paper, leather, wood, metals, etc., in adhesives and numerous other uses wherein the extremely high viscosities of these materials are advantageous. A particularly valuable use of the vinyl ester copolymers of the invention which possess a certain degree of water solubility, e. g., which are capable of forming aqueous solutions in a concentration of 1% or more, is for the purpose of dispersing monomeric materials during the polymerization thereof in aqueous media. The use of the products of this type as dispersing agents in the preparation of vinyl halide polymers in granular form is described and claimed in my copending application Serial No. 691,412, filed August 17, 1946, now Patent 2,476,474, issued July 19, 1949.

It is obvious that many variations may be made in the processes and products of this invention without departing from the spirit and scope thereof as defined in the appended claims.

When the term "mol" is used in the examples, it is used to designate one gram-molecular weight.

What is claimed is:

1. In a process for copolymerizing an ester of a monocarboxylic acid and an alcohol containing a $CH_2=C<$ group with a compound of the formula

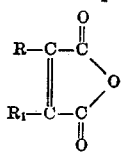

wherein R and $R_1$ stand for radicals from the group hydrogen, halogen, alkyl, aralkyl, aryl and alkaryl, the step which comprises carrying out the polymerization in the presence of 20–100 parts for every 100 parts of monomer, of an inert liquid which is a solvent for the unpolymerized materials, but a non-solvent for the polymerization product and in the presence of from 0.02 to 1.0 part of an oil-soluble peroxide catalyst per 100 parts of monomer, said polymerization reaction being carried out in the substantial absence of air at from 40–80° C., the molar ratio of said ester to said unsaturated anhydride being from 1:1 to 9:1.

2. A process as defined in claim 1 in which R and $R_1$ are hydrogen.

3. A process as defined in claim 1 in which the ester is a vinyl ester of a fatty acid containing not over 6 carbon atoms.

4. A process as defined in claim 2 in which the ester is a vinyl ester of a fatty acid containing not over 6 carbon atoms.

5. A process as defined in claim 2 in which the ester is vinyl acetate, and the inert liquid is an aromatic hydrocarbon.

6. A process as defined in claim 2 in which the ester is vinyl acetate and the inert liquid is benzene.

MASSIMO BAER.

REFERENCES CITED

The following references are of record in the file of this patent:

UNITED STATES PATENTS

| Number | Name | Date |
|---|---|---|
| 2,047,398 | Voss | July 14, 1936 |
| 2,064,565 | Reid | Dec. 15, 1936 |
| 2,286,062 | Condo | June 9, 1942 |
| 2,345,659 | Downes | Apr. 4, 1944 |
| 2,378,629 | Hanford | June 19, 1945 |
| 2,430,313 | Vana | Nov. 4, 1947 |

FOREIGN PATENTS

| Number | Country | Date |
|---|---|---|
| 376,479 | Great Britain | July 14, 1932 |

OTHER REFERENCES

Mark et al.; High Polymeric Reactions, Interscience, 1941, pp. 79 and 80.